No. 744,325. PATENTED NOV. 17, 1903.
H. FRANKENBERG.
THERMOMETER.
APPLICATION FILED APR. 4, 1903.
NO MODEL.
Fig:1.
Fig:2.
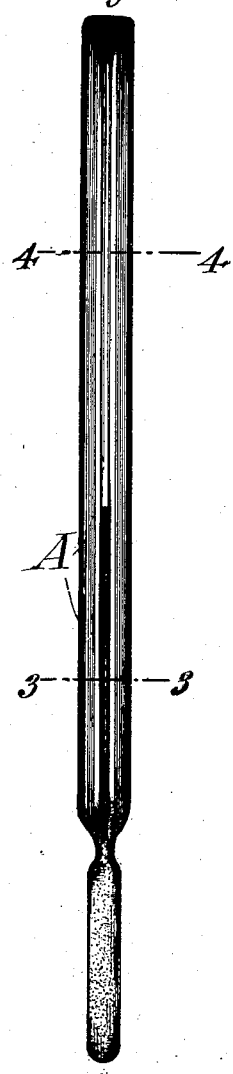
Fig:3.
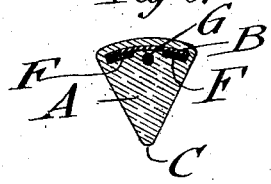
Fig:4.
Witnesses
C. P. Goebel.
Henry J. Suhrbier
Inventor
Herman Frankenberg
By his Attorneys
Fowell & Niles No. 744,325.                                                                    Patented November 17, 1903.

UNITED STATES PATENT OFFICE.

HERMAN FRANKENBERG, OF NEW YORK, N. Y.

THERMOMETER.

SPECIFICATION forming part of Letters Patent No. 744,325, dated November 17, 1903.

Application filed April 4, 1903. Serial No. 151,058. (No model.)

*To all whom it may concern:*

Be it known that I, HERMAN FRANKENBERG, a citizen of the United States, residing at New York, borough of Brooklyn, and State of New York, have invented certain new and useful Improvements in Thermometers, of which the following is a specification.

My invention relates to thermometers, more particularly to fever-thermometers, and has for its object to facilitate the reading thereof, so that persons inexperienced as well as experienced in the use of such instruments may more readily and with greater accuracy determine the readings thereof; and for this purpose the invention consists of a thermometer the prismatic body of which has one edge formed in a lens and the opposite side provided with a layer of opaque material having parallel streaks of a different color from the layer and at a distance apart corresponding approximately to the width of the magnified mercury-thread, as will be more fully described hereinafter and finally pointed out in the claims.

In the accompanying drawings, Figure 1 is a front view of a fever-thermometer provided with my improved means for quickly ascertaining the reading thereof. Fig. 2 is also a front view of a fever-thermometer, without, however, showing the graduated markings, so as to show more clearly the contrast of the mercury-thread with the colored streaks. Fig. 3 is a horizontal section on line 3 3, Fig. 2; and Fig. 4 is a horizontal section on line 4 4, Fig. 2.

Similar letters of reference indicate corresponding parts.

Referring to the drawings, A represents a fever-thermometer the prismatic body of which is rounded off at one edge, so as to form a lens C, and provided with a graduated scale and figures for denoting the height of the mercury-thread or degrees. One side of the body (that opposite the lens C) is provided with an interior opaque layer of glass B, preferably and usually milk-glass or other white material.

Fever-thermometers are necessarily of such fine calibers, and particularly the mercury-thread thereof, that the reading of the same has been a source of much inconvenience and annoyance, inasmuch as the structure has to be held in one precise position before it was possible to obtain a reading, which position has to be determined by considerable time-consuming experimenting, while the least deviation from the same would render the structure useless. Even the use of the white opaque background did not serve as a sufficient contrast to the mercury-thread G when determining the height of the same. To obviate these objections, glass strips or streaks of opaque material differing in color from the opaque layer B are arranged on the inner side of the latter, so as to leave uncovered a central band of the opaque layer B of a width corresponding approximately to the width of the magnified mercury-thread. These contrasting streaks F are parallel and may be of any colored glass, as yellow, red, &c., and may be embodied with or superposed on the opaque layer B. In carrying out my invention any combination of color may be used; but more particularly I prefer to use yellow streaks on white background or yellow streaks on red background, which have been found to give a sharp contrast to the color of the mercury, so that the height of the mercury-thread may be readily and accurately determined. When the lens C is exactly in line with the mercury-thread G and the eye, the height of the mercury may be quickly determined, as the colored streaks or bands surround the two sides of the magnified mercury-thread, while the band of opaque material B remaining uncovered above the mercury-thread forms an effective contrast to the thread G, which enables thereby the height of the same to be determined instantly, rapidly, and accurately.

Having thus described my invention, I claim as new and desire to secure by Letters Patent—

1. A thermometer, the prismatic body of which is formed at one edge with a lens and provided at the opposite side with a layer of opaque material having parallel streaks or bands of a different color from the layer, substantially as set forth.

2. A thermometer, the prismatic body of which is formed with a lens and provided at its opposite side with a layer of opaque material having parallel streaks of a different color from the layer and at a distance apart corresponding approximately to the width of the magnified mercury-thread, substantially as set forth.

In testimony that I claim the foregoing as my invention I have signed my name in presence of two subscribing witnesses.

HERMAN FRANKENBERG.

Witnesses:
PAUL GOEPEL,
C. P. GOEPEL.